(12) United States Patent
Malave et al.

(10) Patent No.: US 10,396,897 B1
(45) Date of Patent: Aug. 27, 2019

(54) SYSTEMS AND METHODS FOR PREDICTING DEFECTS IN OPTICAL TRANSCEIVER DEVICES

(71) Applicant: General Electric Company, Schenectady, NY (US)

(72) Inventors: Peter Malave, Milwaukee, WI (US); Partha Natampalli, Fremont, CA (US); Aniruddha Banke Tiwari, Waukesha, WI (US); Jonathan Clarence West, Sussex, WI (US); Steven James Huff, Watertown, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/955,554

(22) Filed: Apr. 17, 2018

(51) Int. Cl.
 *H04B 10/00* (2013.01)
 *H04B 10/40* (2013.01)
 *H04B 10/079* (2013.01)

(52) U.S. Cl.
 CPC ....... *H04B 10/40* (2013.01); *H04B 10/07955* (2013.01)

(58) Field of Classification Search
 USPC .................................................. 398/1–9, 22
 See application file for complete search history.

(56) References Cited

U.S. PATENT DOCUMENTS

| | | | | |
|---|---|---|---|---|
| 7,302,186 B2 * | 11/2007 | Light | ................. | H04B 10/0799 398/135 |
| 7,466,404 B1 * | 12/2008 | Vacar | ................... | H01S 5/0021 356/237.3 |
| 8,233,804 B2 * | 7/2012 | Aguren | ................ | H04B 10/073 235/375 |
| 8,311,408 B2 * | 11/2012 | Astigarraga | ........... | H04B 10/40 398/135 |
| 8,340,923 B2 * | 12/2012 | Wood | ................... | G06F 11/008 702/34 |
| 8,879,909 B2 * | 11/2014 | Heimbuch | ............. | H04B 10/40 250/214 A |
| 8,886,033 B2 * | 11/2014 | Azadeh | ................. | H04B 10/40 398/22 |
| 9,092,307 B2 * | 7/2015 | Langer | .................... | G06F 11/00 |
| 9,251,689 B2 * | 2/2016 | Xiong | ................... | G08B 21/182 |
| 9,292,473 B2 * | 3/2016 | Ba | .......................... | G06F 17/00 |
| 9,664,725 B2 * | 5/2017 | Amoussouga | ........ | G06F 11/008 |
| 9,876,566 B1 * | 1/2018 | Fludger | ............ | H04B 10/07951 |
| 9,967,027 B2 * | 5/2018 | Fludger | .............. | H04B 10/0795 |
| 2004/0136708 A1 * | 7/2004 | Woolf | .................... | H04B 17/15 398/22 |
| 2005/0031357 A1 * | 2/2005 | Soto | ................... | H04B 10/0799 398/198 |

(Continued)

Primary Examiner — Agustin Bello
(74) Attorney, Agent, or Firm — McCoy Russell LLP

(57) ABSTRACT

Methods and systems are provided for monitoring optical transceiver devices. In one embodiment, a method comprises predicting degradation of an optical transceiver device based on values of an operating parameter of the optical transceiver device obtained over time, and generating a notification of the degradation of the optical transceiver device. In this way, an optical transceiver device that is susceptible to degradation may be pre-emptively identified and replaced, thereby preventing failures of a communication system including the optical transceiver device.

18 Claims, 7 Drawing Sheets

(56) References Cited

U.S. PATENT DOCUMENTS

| | | | |
|---|---|---|---|
| 2010/0014853 A1* | 1/2010 | Astigarraga | H04B 10/07 398/9 |
| 2010/0014855 A1* | 1/2010 | Arnone | H04J 14/0227 398/17 |
| 2010/0080554 A1* | 4/2010 | Aguren | H04B 10/073 398/20 |
| 2010/0098413 A1* | 4/2010 | Li | H04B 10/0795 398/38 |
| 2010/0150567 A1* | 6/2010 | Kondo | H04B 10/40 398/137 |
| 2011/0069950 A1* | 3/2011 | Ito | H04B 1/74 398/9 |
| 2011/0220779 A1* | 9/2011 | Takaoka | H01S 5/02284 250/216 |
| 2013/0251361 A1* | 9/2013 | Azadeh | H04B 10/075 398/22 |
| 2014/0119740 A1* | 5/2014 | Tay | H04B 10/802 398/158 |
| 2014/0301740 A1* | 10/2014 | Rope | H04B 10/40 398/135 |
| 2015/0243155 A1* | 8/2015 | Xiong | G08B 21/182 398/135 |
| 2015/0263805 A1* | 9/2015 | Shrikhande | H04J 3/14 398/23 |
| 2016/0142136 A1* | 5/2016 | Izumi | H04B 10/07955 398/38 |
| 2016/0187608 A1* | 6/2016 | Brown | G01M 11/37 356/73.1 |
| 2017/0111113 A1* | 4/2017 | Shrikhande | H04J 3/14 |
| 2017/0163346 A1* | 6/2017 | Aronson | G01M 11/00 |
| 2018/0109314 A1* | 4/2018 | Shrikhande | H04J 3/14 |
| 2018/0294876 A1* | 10/2018 | Abidi | H04B 10/27 |

* cited by examiner

SYSTEMS AND METHODS FOR PREDICTING DEFECTS IN OPTICAL TRANSCEIVER DEVICES

FIELD

Embodiments of the subject matter disclosed herein relate to optical communication systems, and more particularly, to predicting defects in optical transceiver devices.

BACKGROUND

Optical transceiver devices, such as small form-factor pluggable (SFP) devices, include a transmitter and a receiver for transmitting and receiving data in the form of light pulses over fiber optic cables, as well as converting data in the form of light pulses and electrical signals. These optical transceiver devices may be coupled to a network device mother board (e.g., for a network switch, a router, and so on) to provide an interface between the network device mother board and one or more optical fiber optic cables. Communication systems, such as telecommunication systems and other data communications applications, may therefore include a plurality of such optical transceiver devices for facilitating rapid, high-bandwidth data communication.

Magnetic resonance imaging (MM) systems are one example of a system that may include and rely on such a communication system. MM is a non-invasive medical imaging modality that can create pictures of the inside of a human body without using x-rays or other ionizing radiation. An MRI system uses a powerful magnet to create a strong, uniform, static magnetic field (i.e., the "main magnetic field"). When a human body, or a part of a human body, is placed within the main magnetic field, the nuclear spins that are associated with the hydrogen nuclei in tissue water become polarized such that the magnetic moments associated with these spins become preferentially aligned along the direction of the main magnetic field, resulting in a small net tissue magnetization along that axis (the "z-axis," by convention). An MRI system also comprises components called gradient coils that produce smaller-amplitude, spatially-varying magnetic fields when current is applied to them. Typically, gradient coils are designed to produce a magnetic field component that is aligned along the z-axis, and that varies linearly in amplitude with position along one of the x, y, or z axes. The effect of a gradient coil is to create a small ramp on the magnetic field strength, and concomitantly on the resonant frequency of the nuclear spins, along a single axis. Three gradient coils with orthogonal axes are used to spatially encode the MR signal by creating a signature resonance frequency at each location in the body. Radio frequency (RF) coils are used to create pulses of RF energy at or near the resonance frequency of the hydrogen nuclei. These coils are used to add energy to the nuclear spin system in a controlled fashion. As the nuclear spins then relax back to their rest energy state, they give up energy in the form of an RF signal. This signal is detected by the RF coils, and combined with multiple additional such signals may be used to reconstruct an MR image.

Given the dual use of RF coils for creating RF pulses as well as detecting the resulting RF signals, fast and consistent transmission of the RF signals from the RF coils as well as transmission of control signals to the RF coils is highly desirable. To that end, optical fibers may be used to transmit data between control apparatuses and the RF coils, and optical transceiver devices may be used to rapidly convert the optical signals carried by the optical fibers into electrical signals, and vice versa. MRI systems may therefore include a plurality of such optical transceiver devices.

BRIEF DESCRIPTION

In one embodiment, a method comprises predicting degradation of an optical transceiver device based on values of an operating parameter of the optical transceiver device obtained over time, and generating a notification of the degradation of the optical transceiver device. In this way, an optical transceiver device that is susceptible to degradation may be pre-emptively identified and replaced, thereby preventing failures of a communication system including the optical transceiver device.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 5:
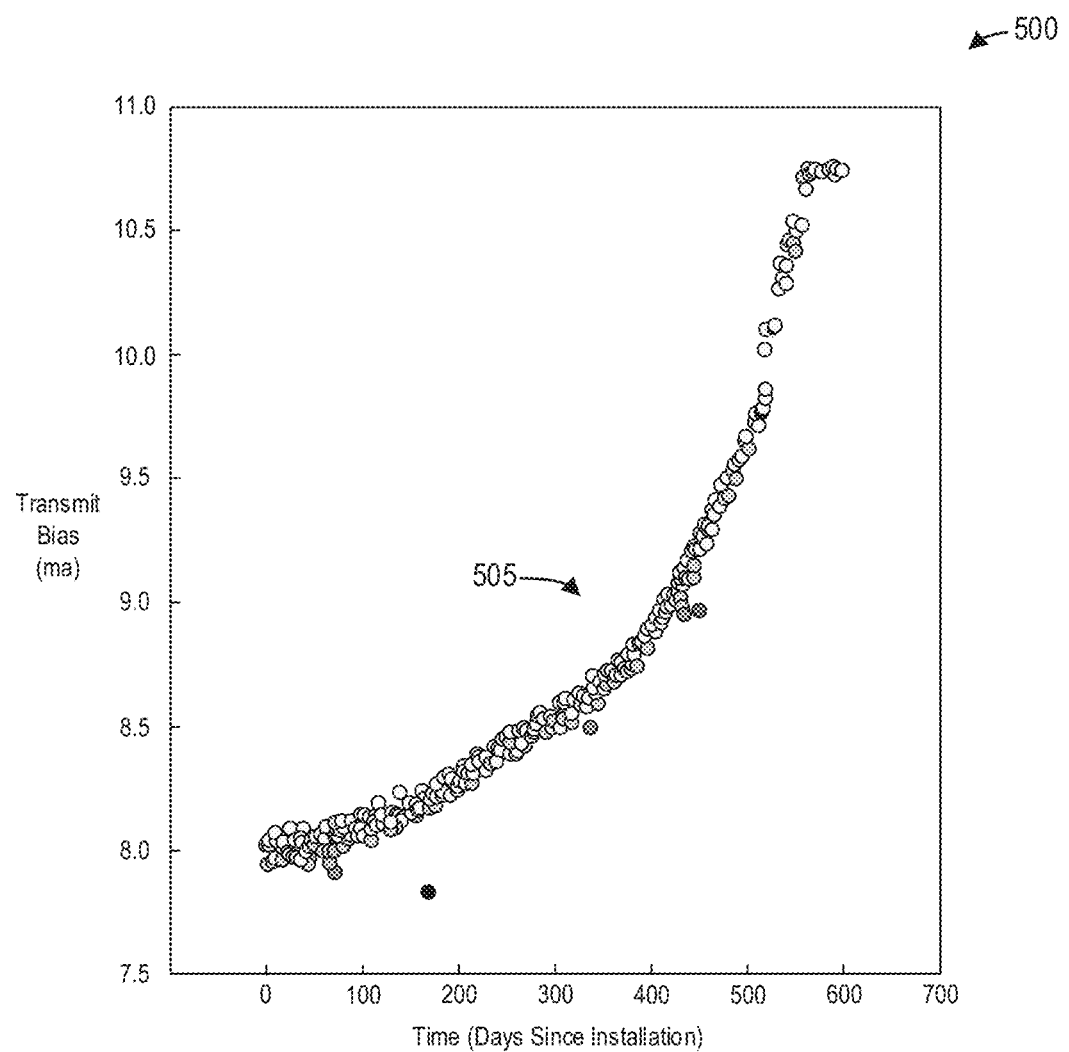
FIG. 5 shows a graph illustrating transmit bias as a function of time for a defective optical transceiver device.
Figure 6:
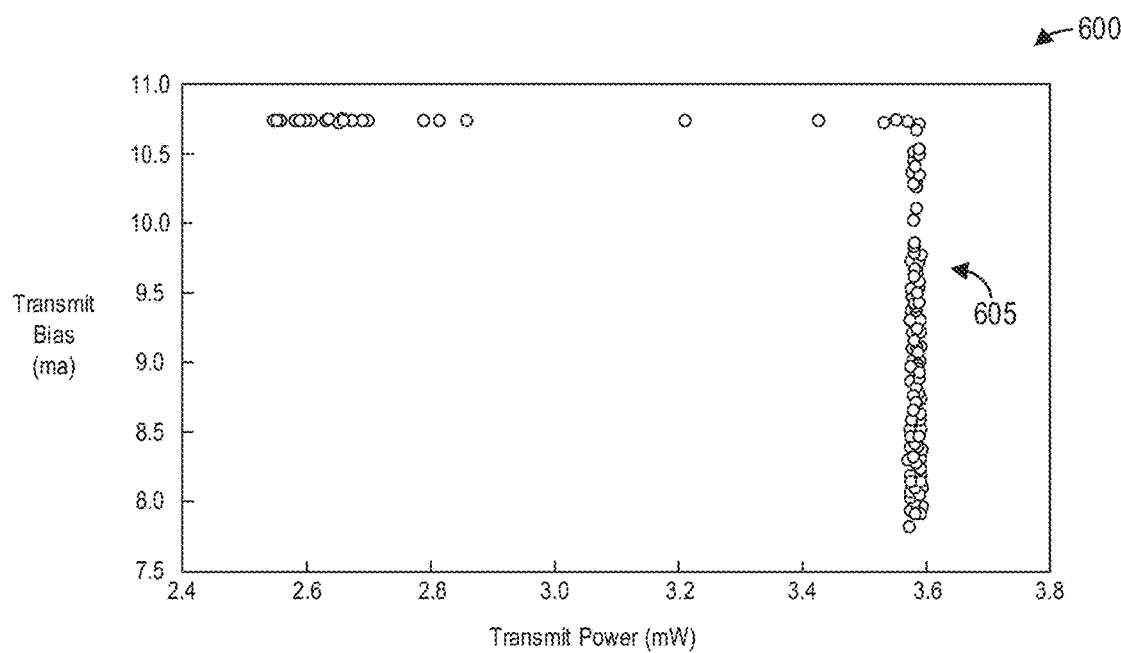
FIG. 6 shows a graph illustrating transmit bias as a function of transmit power for a defective optical transceiver device.
Figure 7:
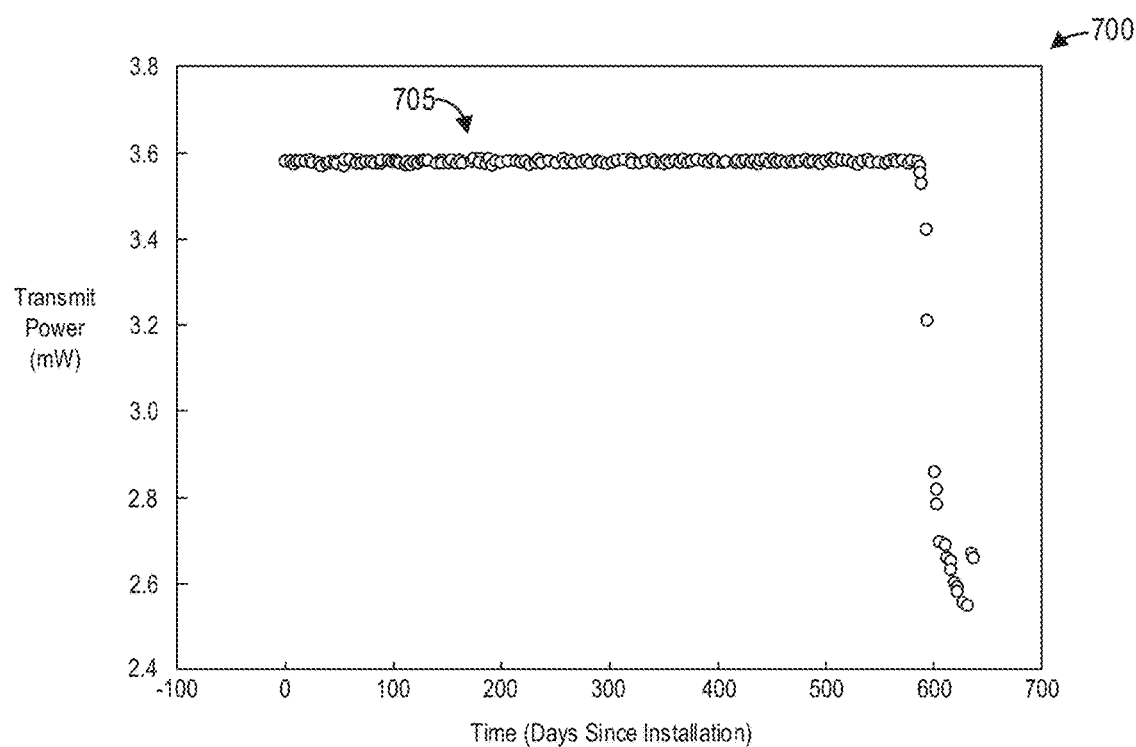
FIG. 7 shows a graph illustrating transmit power as a function of time for a defective optical transceiver device.
Figure 8:
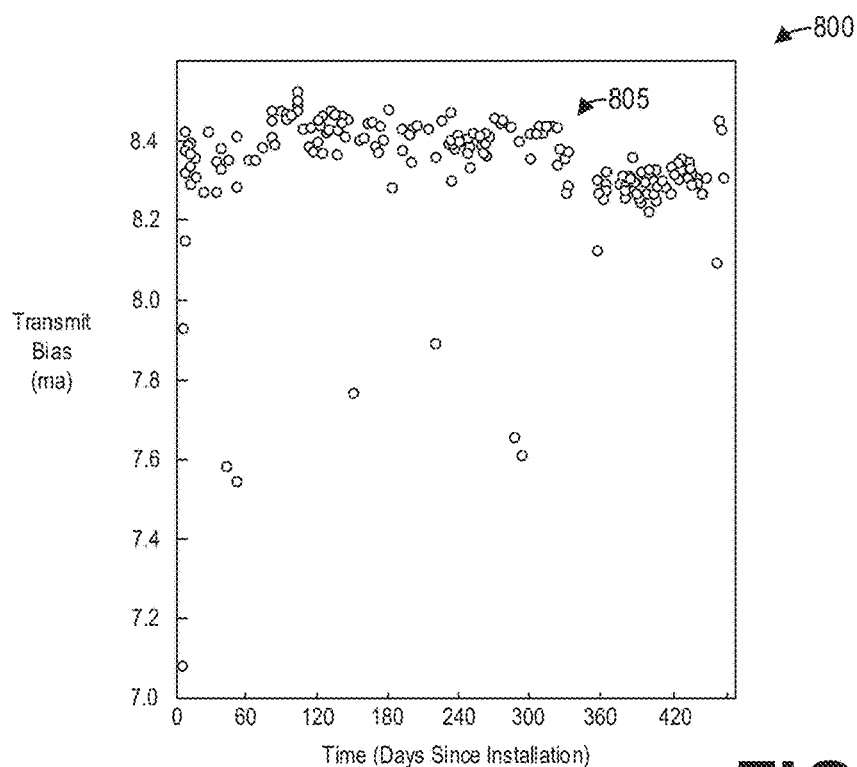
FIG. 8 shows a graph illustrating transmit bias as a function of time for a nominal optical transceiver device.
Figure 9:
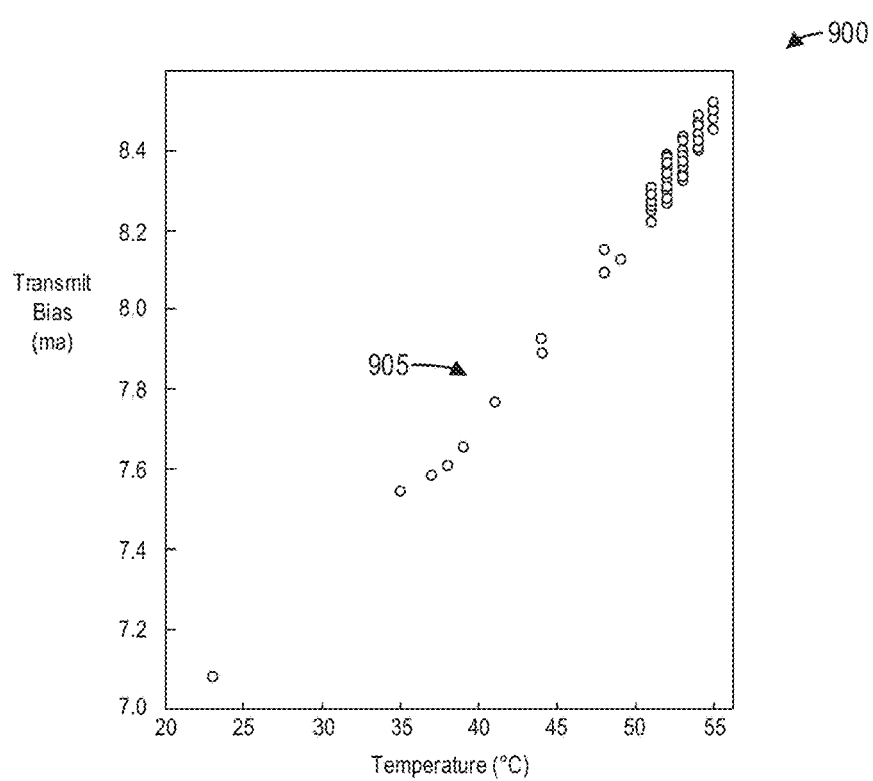
FIG. 9 shows a graph illustrating transmit bias as a function of temperature for a nominal optical transceiver device.
Figure 11:
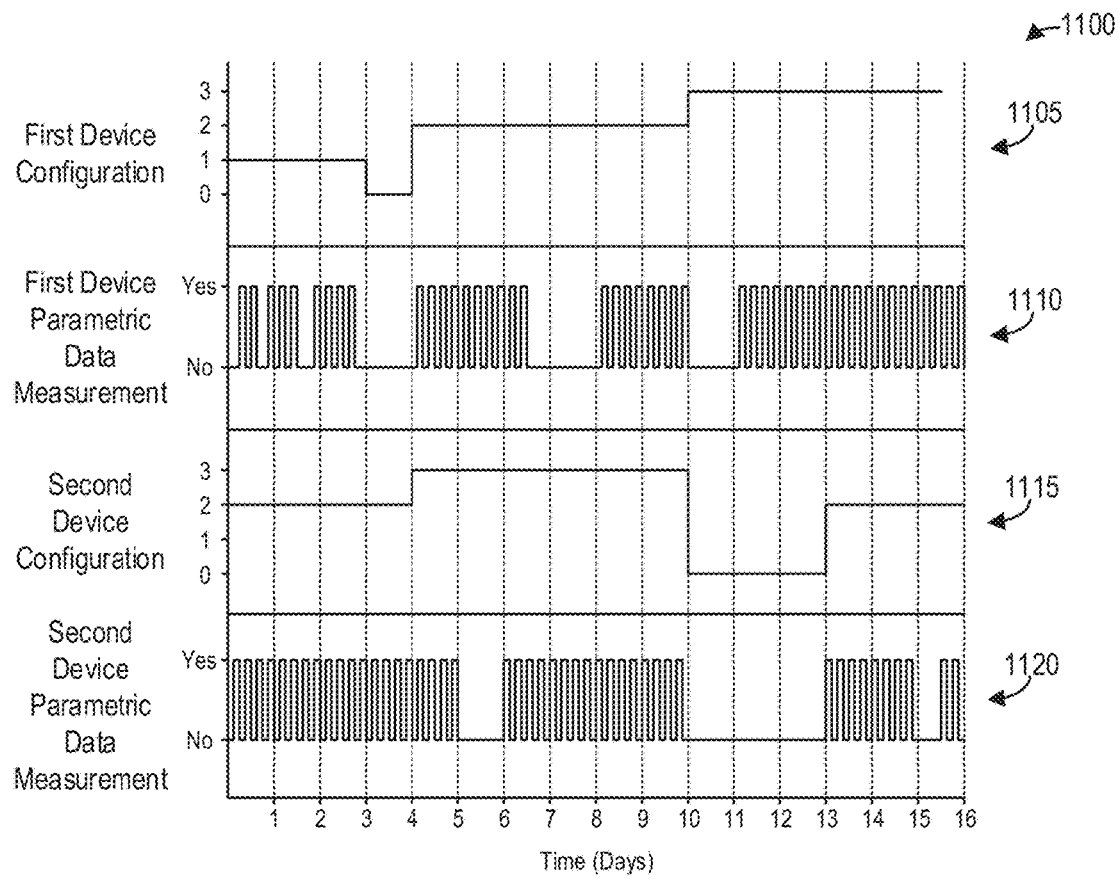
FIG. 11 shows a plurality of graphs illustrating parametric data and device configuration data for two optical transceiver devices according to an embodiment.
Figure 12:
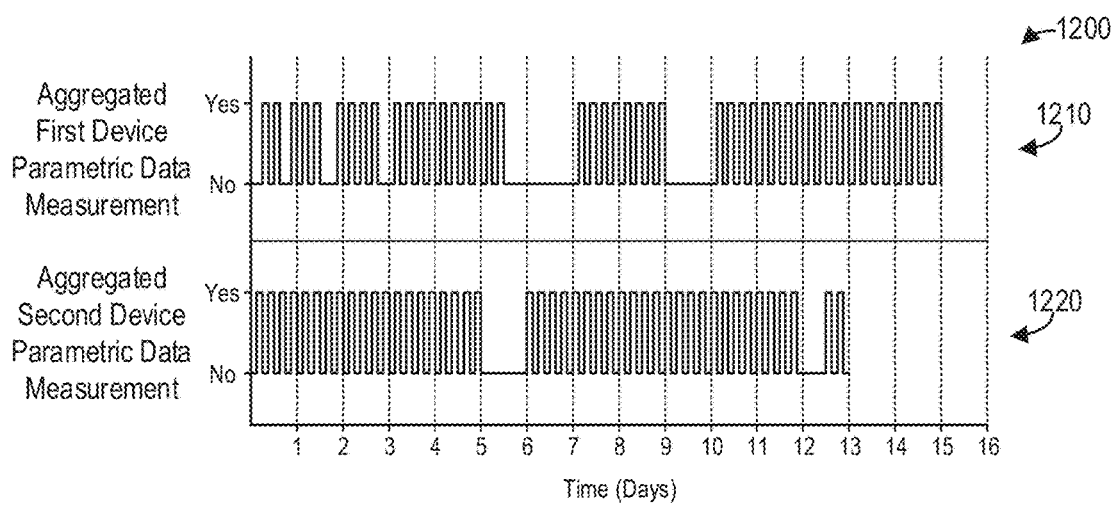
FIG. 12 shows a plurality of graphs illustrating aggregated parametric data for two optical transceiver devices according to an embodiment.

The following description relates to various embodiments of optical communication systems. In particular, systems and methods are provided for predicting degradation of optical transceiver devices in a communication system. A system for predicting degradation of optical transceiver devices, such as the system depicted in FIG. 1, may include a server configured to predict whether one or more optical transceiver devices of a communication system in an imaging system are defective based on parametric data generated by the optical transceiver devices. More generally, a system for predicting optical transceiver device degradation, such as the system depicted in FIG. 2, may include a computing device that retrieves parametric data generated by one or more optical transceiver devices of a communication system and generates a prediction of whether the optical transceiver devices are defective by applying the parametric data to a learning model. An optical transceiver device, such as the optical transceiver device depicted in FIGS. 3 and 4, may comprise a transmitter and a receiver. A dark line defect may occur in a laser of the transmitter when the laser is subjected to electrostatic discharge (ESD). As the dark line defect grows over time, the transmit bias of the laser may increase exponentially, as depicted in FIG. 5, in order to compensate for the dark line defect. When the dark line defect grows to the point where the transmit bias is maximized, the transmit power of the laser begins to drop substantially, as depicted in FIGS. 6 and 7. It is desirable to identify the presence of a dark line defect prior to the maximization of transmit bias or the drop in transmit power, as such events occur close to the complete failure of the optical transceiver device, which may in turn cause a hard system failure of an imaging system relying on the optical transceiver device for data communication. Threshold-based techniques for detecting dark line defects may thus be ineffective, as the transmit bias of a nominal optical transceiver device, depicted in FIG. 8, may vary substantially over time. The temperature of an optical transceiver device is related to the transmit bias, as depicted in FIG. 9, and thus may be used in addition to the transmit bias for predicting a defect. A method for predicting a defect of an optical transceiver device, such as the method depicted in FIG. 10, includes calculating a plurality of features based on parametric data such as transmit bias and temperature, and inputting the plurality of features into a learning model configured to predict the defect. As depicted in FIGS. 11 and 12, parametric data for optical transceiver devices may be aggregated according to device configuration data.

Figure 1:
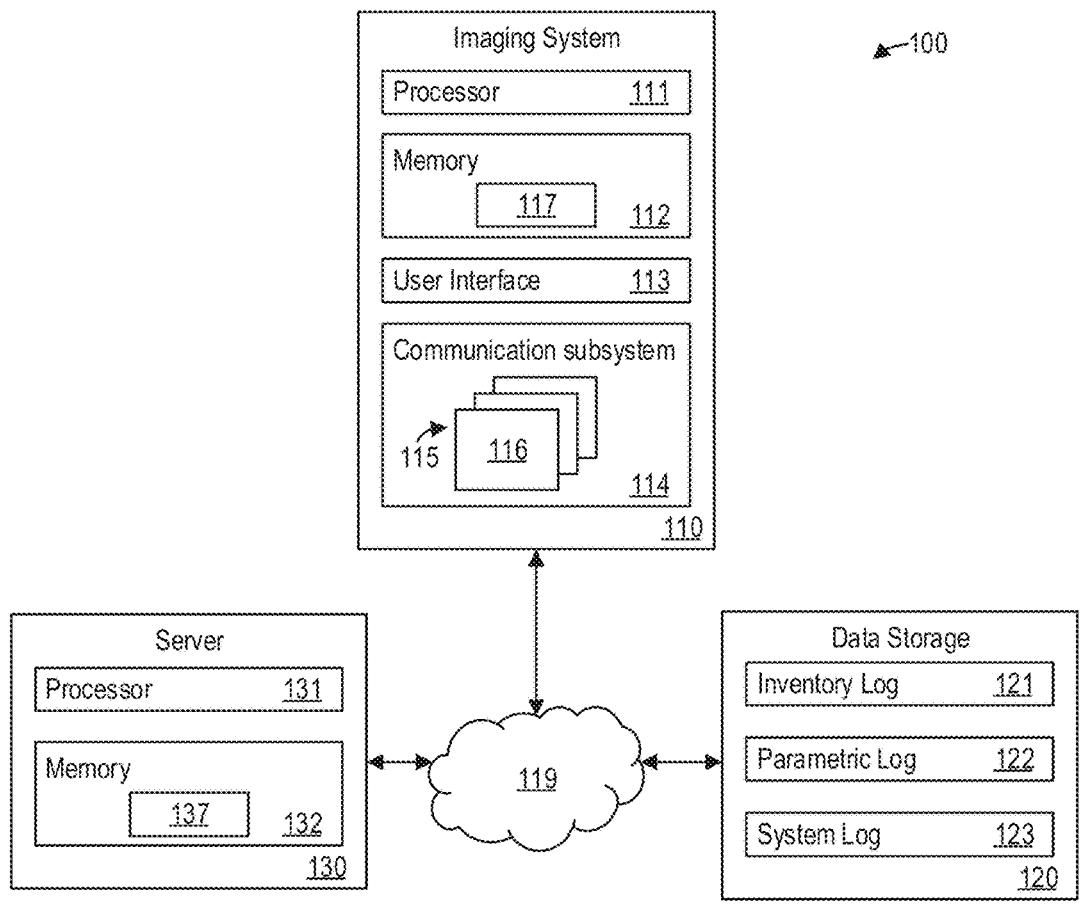
FIG. 1 illustrates an example system for monitoring optical transceiver devices in an imaging system according to an embodiment.

FIG. 1 illustrates an example system 100 for monitoring optical transceiver devices according to an embodiment. System 100 includes at least one imaging system 110 configured for imaging a subject. For example, the imaging system 110 may comprise a non-invasive medical imaging system such as a magnetic resonance imaging (MRI) system, a computed tomography (CT) imaging system, an ultrasound imaging system, an x-ray radiography imaging system, a positron emission tomography (PET) imaging system, a single-photon emission computed tomography (SPECT) imaging system, or a multi-modality imaging system comprising two or more imaging modalities such as a PET/CT imaging system.

The imaging system 110 includes a processor 111, a memory 112, and a user interface 113. The imaging system 110 further includes a communication system 114. Communication system 114 communicatively couples components of the imaging system 110 (such as RF coils and RF coil controllers, for example) for transmitting data, for example over an optical fiber, between the components. The communication system 114 comprises a plurality of optical transceiver devices 115 for converting optical signals into electrical signals (e.g., receiving) and converting electrical signals into optical signals (e.g., transmitting). For example, an optical transceiver device 116 of the plurality of optical transceiver devices 115 may be installed at a component of the imaging system 110 and configured to transmit and receive data. As an illustrative and non-limiting example, the optical transceiver device 116 may be installed at an RF body coil in an MRI system and configured to transmit data from the RF body coil to a data acquisition unit of the MM system as well as receive data (e.g., commands and control parameters) from a controller unit of the MM system.

Each optical transceiver device 116 of the plurality of optical transceiver devices 115 outputs parametric data for monitoring or diagnosing the optical transceiver device 116. The parametric data output by the optical transceiver device 116 may include, but is not limited to, transmit bias, transmit power, receive power, temperature, and so on. As discussed further herein, a defect in the optical transceiver device 116 may be detected based on the parametric data. For example, a dark line defect of the optical transceiver device 116 may be detected or predicted based at least on the measured transmit bias of the optical transceiver device 116.

In some examples, instructions 117 may be stored in non-transitory memory 112 for aggregating the parametric data and predicting whether a defect in the optical transceiver device 116 is present based on the parametric data. A method which may be stored as instructions 117 is discussed further herein with regard to FIG. 10.

As depicted in FIG. 1, the imaging system 110 may be communicatively coupled to one or more of a data storage 120 and a server 130 via a network 119, such as the Internet or a private network. The parametric data generated by each optical transceiver device 116 of the plurality of optical transceiver devices 115 may be output to the data storage 120 via the network 119. The server 130 may retrieve the parametric data from the data storage 120 via the network 119, or in some examples may retrieve the parametric data directly from the plurality of optical transceiver devices 115 of the imaging system 110 via the network 119. Further, the server 130 may generate alerts indicating the presence of a defect that are output to the imaging system 110 via the network 119. The alert may be displayed to a user of the imaging system 110, for example via the user interface 113, which in some examples may comprise a display device.

The data storage 120 stories a plurality of logs, including but not limited to an inventory log 121, a parametric log 122, and a system log 123. To that end, data storage 120 may comprise at least a non-transitory memory storing the inventory log 121, the parametric log 122, and the system log 123. It should be appreciated that in some examples, the data storage 120 may comprise a computing device including at least a processor and a non-transitory memory storing the plurality of logs.

The inventory log 121 comprises device configuration data for the plurality of optical transceiver devices 115. For example, the inventory log 121 may store data indicating a location of the optical transceiver device 116 along with a serial number of the optical transceiver device 116 as well as a system identifier for the imaging system 110. The inventory log 121 may further store data indicating an installation time for the optical transceiver device 116 as well as an uninstallation time for the optical transceiver device 116. The installation time for the optical transceiver device 116 may comprise the date and time at which the optical transceiver device 116 is installed at a particular location in the communication system 114, for example. Similarly, the uninstallation time for the optical transceiver device 116 may comprise the date and time at which the optical transceiver device 116 is uninstalled from the particular location in the communication system 114. In this way, the inventory log 121 comprises a log indicating where and when optical transceiver devices 116 of the plurality of optical transceiver devices 115 are installed in the communication system 114.

The parametric log 122 comprises parametric data output by each optical transceiver device 116 of the plurality of optical transceiver devices 115. The parametric data output by an optical transceiver device 116 may include a plurality of operating parameters of the optical transceiver device 116, including but not limited to temperature, transmit bias, transmit power, receive power, and so on.

The system log 123 comprises error logging data for the imaging system 110. In some examples, the system log 123 may comprise error logging data for a plurality of imaging systems including at least the imaging system 110. Each entry in the system log 123 may thus include one or more of the system identifier for the imaging system 110, the serial number of the optical transceiver device 116, an error message code, an error message text, and a timestamp indicating when the error message was generated.

System 100 further comprises a server 130 for diagnosing defects in one or more optical transceiver devices 116 of the plurality of optical transceiver devices 115. The server 130 comprises at least a processor 131 and a non-transitory memory 132. Instructions 137 may be stored in the non-transitory memory 132 of the server 130 for aggregating log data stored in data storage 120, training a learning model to detect a defect in an optical transceiver device 116, and inputting log data for an optical transceiver device 116 to the learning model to detect a defect in the optical transceiver device 116. Example instructions 137 stored in non-transitory memory 132 and executable by the processor 131 are discussed further herein with regard to FIG. 10. The server 130 may be configured to regularly retrieve parametric data for each optical transceiver device 116 of the plurality of optical transceiver devices 115, and to apply the parametric data to the learning model to predict degradation. In this way, the server 130 may continuously or intermittingly monitor and diagnose the plurality of optical transceiver devices 115.

Figure 2:
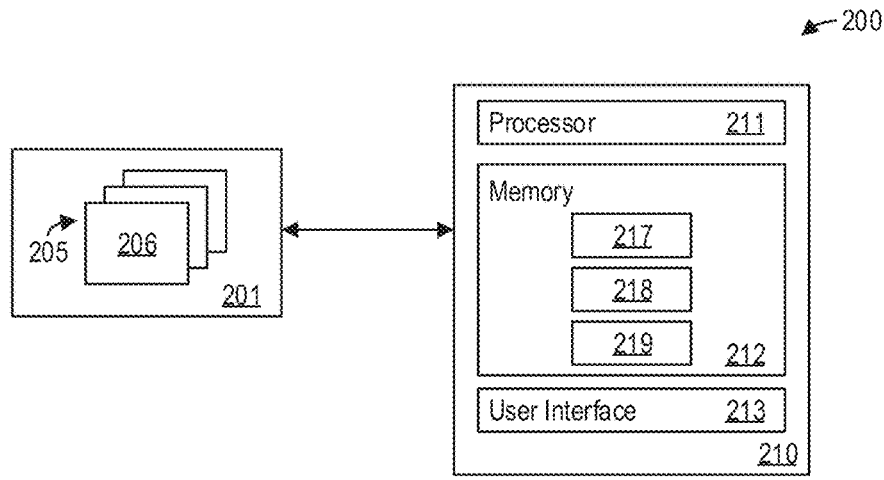
FIG. 2 shows a block diagram illustrating another example system for monitoring optical transceiver devices according to an embodiment.

FIG. 2 shows another example system 200 for monitoring a plurality of optical transceiver devices 205 according to an embodiment. The system 200 comprises a communication system 201 comprising the plurality of optical transceiver devices 205 including an optical transceiver device 206.

System 200 further comprises a computing device 210 communicatively coupled to the communication system 201. The computing device 210 may be locally or remotely positioned near the communication system 201. The computing device 210 includes a processor 211, a non-transitory memory 212, and a user interface 213. The non-transitory memory 212 may include instructions 217 executable by the processor 211 that when executed cause the processor to predict whether the optical transceiver device 206 is degraded due to a dark line defect. To that end, parametric data 218 generated by the optical transceiver device 206 may be stored in the non-transitory memory 212. The instructions 217 when executed by the processor 211 may cause the processor 211 to retrieve the parametric data 218 and predict, with a learning model 219, whether the optical transceiver device 206 includes a dark line defect. Example instructions 217 for predicting degradation of the optical transceiver device 206 are discussed further herein with regard to FIG. 10.

Thus, with regard to both FIGS. 1 and 2, a system comprises a communication system including a plurality of optical transceiver devices, and a processor configured with instructions in non-transitory memory that when executed cause the processor to predict degradation of an optical transceiver device of the plurality of optical transceiver devices based on a measured operating parameter of the optical transceiver device.

Figure 3:
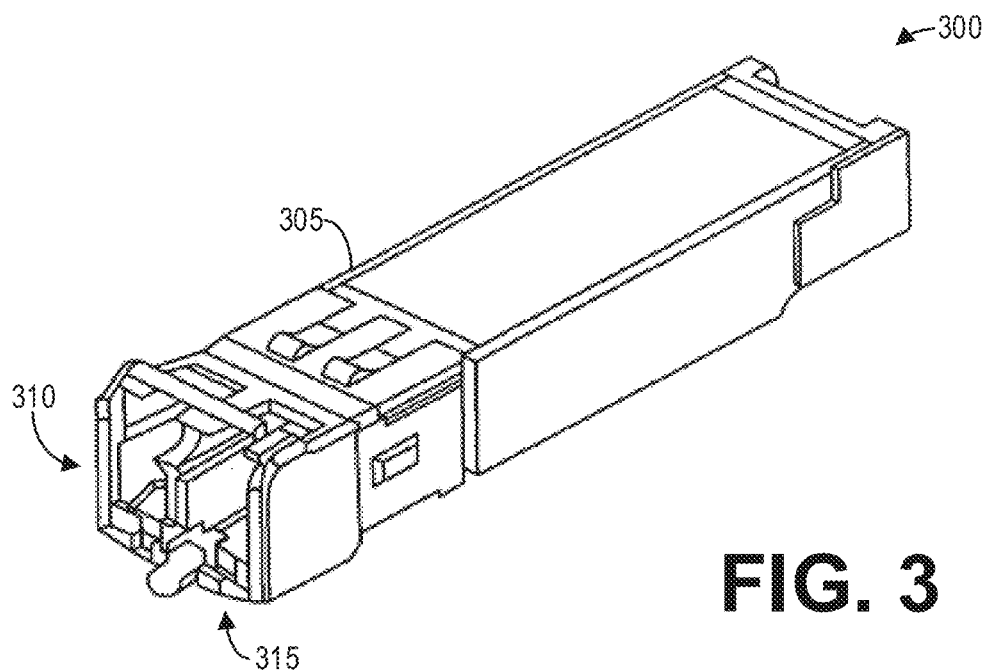
FIG. 3 shows a perspective view of an example optical transceiver device according to an embodiment.

FIG. 3 shows an example optical transceiver device 300 according to an embodiment. The optical transceiver device 300 comprises a small form factor pluggable (SFP) optical transceiver device 300. The optical transceiver device 300 includes a plurality of components, described further herein with regard to FIG. 4, housed within a housing 305. The optical transceiver device 300 further includes a transmit port 310 and a receive port 315 each configured to receive an optical fiber (not shown) for transmitting and receiving data, respectively.

Figure 4:
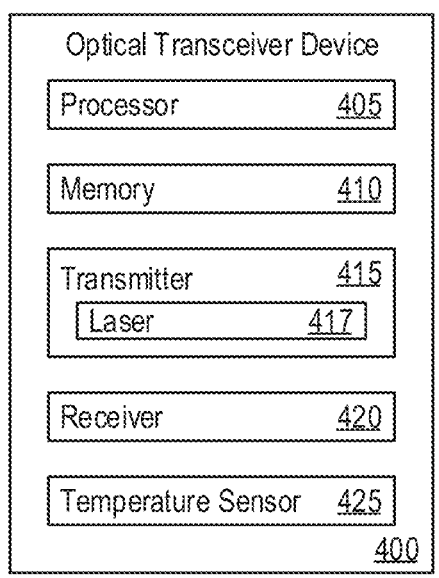
FIG. 4 shows a high-level block diagram illustrating an example optical transceiver device according to an embodiment.

FIG. 4 shows a high-level block diagram illustrating an example optical transceiver device 400 according to an embodiment. The optical transceiver device 400 comprises a processor 405, a non-transitory memory 410, a transmitter 415 including a laser 417, a receiver 420, and one or more sensors such as a temperature sensor 425.

The optical transceiver device 400 may comprise, for example, the optical transceiver device 300 depicted in FIG. 3. To that end, the components of the optical transceiver device 400 may be housed in the housing 305 of the optical transceiver device 300 and may be configured such that a first optical fiber connected to the transmit port 310 is coupled to the transmitter 415 while a second optical fiber connected to the receive port 315 is coupled to the receiver 420.

The laser 417 of the transmitter 415 may be susceptible to dark line defects. Dark line defects comprise line defects that appear during operation of the laser 417 and obstruct transmission. Dark line defects typically result from electrostatic discharge (ESD) damage in the laser 417. Over time, as such dark line defects may grow or increase, the dark line defects increasingly obstruct transmission and degrade performance of an optical transceiver device.

FIG. 5 shows a graph 500 illustrating the behavior of transmit bias over time for an optical transceiver device with a dark line defect. In particular, graph 500 includes a plot 505 of a plurality of measurements of transmit bias of an optical transceiver device as a function of the number of days since the installation of the optical transceiver device in a communication system.

The color of each circle in the plot 505 corresponds to a temperature of the optical transceiver device measured concurrently with the transmit bias, for example by a temperature sensor such as temperature sensor 425. In particular, darker circles correspond to cooler temperatures while lighter circles correspond to warmer temperatures. As depicted, the transmit bias of the optical transceiver device increases as the temperature increases.

As depicted by plot 505, the transmit bias of the optical transceiver device increases exponentially over time. The exponential nature of the increase in transmit bias over time is assumed herein to be an indicator of a dark line defect of an optical transceiver device.

FIG. 6 shows a graph 600 illustrating a plot 605 of transmit bias as a function of transmit power for an optical transceiver device with a dark line defect. Furthermore, FIG. 7 shows a graph 700 illustrating a plot 705 of transmit power as a function of time for the same optical transceiver device with the dark line defect.

As depicted by plots 605 and 705, the transmit power of the optical transceiver device is generally consistent until the optical transceiver device begins to fail. That is, after approximately 600 days since installation of the optical transceiver device, the dark line defect causes the optical transceiver device to fail and so the transmit power begins to decrease from the nominal operating point of 3.6 mW. As depicted by plot 605, the transmit bias increases while the transmit power remains stable near 3.6 mW; once the transmit bias reaches its maximum limit near 10.75 ma, the transmit power begins to decrease.

The drop-off in transmit power depicted by plots 605 and 705 is a strong indicator of a dark line defect. However, monitoring the transmit power of an optical transceiver device for a decrease in transmit power to detect a dark line defect would not be an effective method for avoiding hard failure of the optical transceiver device, as the decrease in transmit power does not occur until the transmit bias is maxed out due to the dark line defect.

Furthermore, simply monitoring the transmit bias of an optical transceiver device for a general increase in transmit bias would also not be an effective method for detecting a defect or avoiding a hard failure of the device. As an illustrative example, FIG. 8 shows a graph 800 illustrating a plot 805 of transmit bias over time for a nominal optical transceiver device without a dark line defect. As depicted by plot 805, the transmit bias of the nominal optical transceiver device is generally consistent although a number of outliers makes a threshold-based degradation detection method difficult to implement. Similar plots of transmit bias for other nominal optical transceiver devices exhibit similar behavior, though in some instances the plots may be piecewise linear or scattered across a range of transmit biases.

FIG. 9 shows a graph 900 illustrating a plot 905 of transmit bias as a function of temperature for the nominal optical transceiver device depicted in FIG. 8. As depicted by plot 905, the transmit bias and the temperature are positively covariant and thus may be well fit by a simple linear regression. For this reason, in some examples the prediction of a dark line defect may take temperature measurements of an optical transceiver device into account, as discussed further herein.

Figure 10:
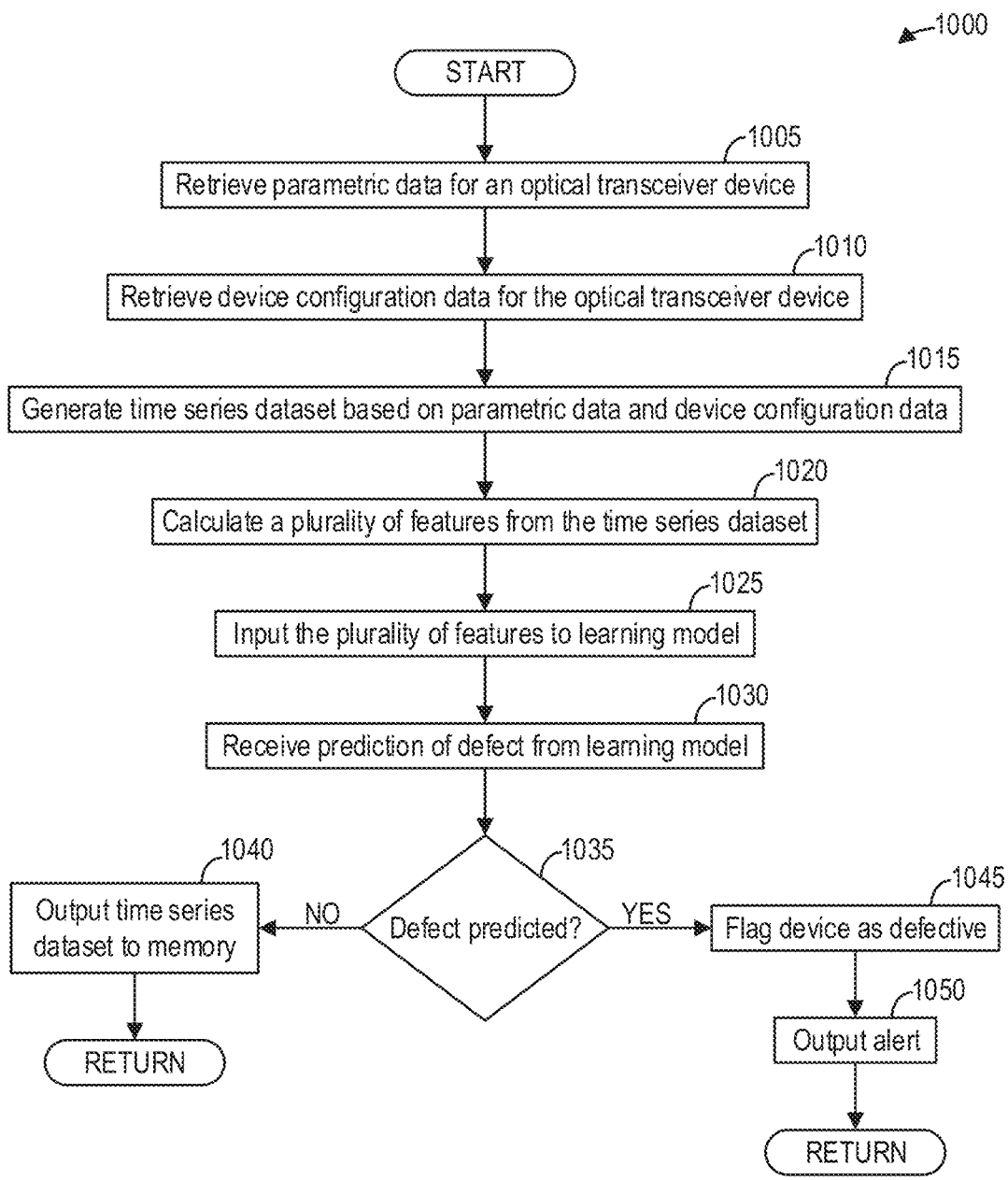
FIG. 10 shows a high-level flow chart illustrating an example method for predicting a defect of an optical transceiver device according to an embodiment.

FIG. 10 shows a high-level flow chart illustrating an example method 1000 for predicting degradation of an optical transceiver device according to an embodiment. In particular, method 1000 relates to predicting a defect of an optical transceiver device based on parametric data of the optical transceiver device. Method 1000 is described with regard to the systems and components of FIGS. 1-4, though it should be appreciated that the method may be implemented with other systems and components without departing from the scope of the present disclosure. Method 1000 may be implemented as instructions in non-transitory memory that are executable by a processor. For example, method 1000 may be stored as instructions 117 of non-transitory memory 112 and executed by processor 111 of an imaging system 110, as instructions 137 of non-transitory memory 132 and executed by processor 130 of a server 130, or as instructions 217 of non-transitory memory 212 and executable by processor 211 of a computing device 210 coupled to a communication system 201.

Method 1000 begins at 1005. At 1005, method 1000 retrieves parametric data for an optical transceiver device. The parametric data is initially generated by the optical transceiver device, such as optical transceiver device 116, and may then be output, for example, by the optical transceiver device to a parametric log such as parametric log 122. The parametric data may comprise a plurality of measured operating parameters of the optical transceiver device, and thus may include, but is not limited to, transmit bias, transmit power, receive power, temperature, and so on. The optical transceiver device may output the parametric data to the parametric log continuously, for example as the parametric data is generated. As another example, the optical transceiver device may collect the parametric data over time and output the collected parametric data to the parametric log at regular intervals. As an illustrative and non-limiting example, the optical transceiver device may collect parametric data over a twenty-four-hour period and output the collected parametric data at the end of the twenty-four-hour period.

The parametric log may be stored in a data storage device, such as data storage 120, which may be remotely positioned relative to the optical transceiver device. Thus, method 1000 may retrieve the parametric data from the parametric log 122. In another example, the parametric data may be stored locally. For example, the parametric data for a plurality of optical transceiver devices 115 of an imaging system 110 may be stored in the non-transitory memory 112 of the imaging system 110. Therefore, in such an example, method 1000 may retrieve the parametric data from the non-transitory memory 112.

At 1010, method 1000 retrieves device configuration data for the optical transceiver device. The device configuration data for the optical transceiver device may be stored, for example, in an inventory log such as inventory log 121. The device configuration data comprises, for example, data regarding the installation of the optical transceiver device. For example, the device configuration data may comprise an installation timestamp, a location of the optical transceiver device within the communication system, and an uninstallation timestamp. Similar to the parametric data, the device configuration data for the optical transceiver device may be stored in the inventory log 121 of a data storage 120, and thus method 1000 may retrieve the device configuration data for the optical transceiver device from the inventory log 121 of the data storage 120. In other examples, the device configuration data may be stored locally, for example in non-transitory memory 112 of the imaging system, and so method 1000 may retrieve the device configuration data from the non-transitory memory 112.

Continuing at 1015, method 1000 generates a time series dataset based on the parametric data and the device configuration data. For example, if the optical transceiver device 116 has been swapped by a technician into different board locations in the communication system 114 over time, the device configuration data indicates the length of time that the optical transceiver device 116 is installed in each location. By generating a time series dataset based on the parametric data and the device configuration data, the resulting time series dataset thus comprises a complete set of parametric data for the optical transceiver device 116 regardless of where the optical transceiver device 116 has been installed within the communication system 114.

As an illustrative and non-limiting example, FIG. 11 shows a plurality of graphs 1100 illustrating example parametric data and example device configuration data over time for a first optical transceiver device and a second optical transceiver device. In particular, the plurality of graphs 1100 includes a first graph 1105 illustrating an example device configuration for the first optical transceiver device; a second graph 1110 illustrating parametric data measurements generated by the first optical transceiver device; a third graph 1115 illustrating an example device configuration for the second optical transceiver device; and a fourth graph

1120 illustrating example parametric data measurements generated by the second optical transceiver device.

For the first graph 1105 and the third graph 1115 illustrating device configurations for the first and second optical transceiver devices, the vertical axis depicts a board location within the communication system where the respective optical transceiver device is installed, wherein "0" indicates that the optical transceiver device is not installed, "1" indicates that the optical transceiver device is installed at a first location, "2" indicates that the optical transceiver device is installed at a second location, and "3" indicates that the optical transceiver device is installed at a third location. For the second graph 1110 and the fourth graph 1120, the vertical axis depicts whether parametric data is generated by the respective optical transceiver device, wherein "Yes" indicates that parametric data is generated and "No" indicates that no parametric data is generated. For each of the graphs 1105, 1110, 1115, and 1120, the horizontal axis depicts time in units of days.

Thus, as depicted by graphs 1105 and 1110, the first optical transceiver device is installed at the first location for the first three days and generates data each day. The first optical transceiver device is then uninstalled from the communication system during the fourth day, so no parametric data is generated. The first optical transceiver device is then installed in the second location from the end of the fourth day until the end of the tenth day when the first optical transceiver device is swapped into the third location of the communication system. As depicted by graph 1110, the first optical transceiver device generates parametric data each day that it is installed in the second board location and the third board location, aside from the eighth day and the eleventh day. As depicted by graph 1115, the second optical transceiver device is installed in the second location for the first five days and in the third location for the next six days. The second optical transceiver device is then uninstalled from the communication system for three days after the tenth day, and re-installed in the second location for three days after the thirteenth day. As depicted by graph 1120, the second optical transceiver device generates parametric data each day, aside from the sixth day when it is installed in the communication system and the three days during which the second optical transceiver device is uninstalled from the communication system.

In order to accurately diagnose both optical transceiver devices, the parametric data measurements for each device may be aggregated according to the device configuration data. As an illustrative example, FIG. 12 shows a plurality of graphs 1200 illustrating example aggregated parametric data for the first and second optical transceiver devices. In particular, the first graph 1210 illustrates the aggregated parametric data measurements for the first optical transceiver device, while the second graph 1220 illustrates the aggregated parametric data measurements for the second optical transceiver device. That is, the first graph 1210 includes the parametric data measurements generated by the first optical transceiver device and depicted by the second graph 1110 of FIG. 11. However, the aggregated parametric data measurements depicted by the first graph 1210 does not include the absence of parametric data measurements depicted by second graph 1110 when the first optical transceiver device was uninstalled from the communication system. Therefore, the first graph 1210 only depicts fifteen days' worth of parametric data measurements instead of sixteen. Further, the aggregated parametric data measurements are concatenated in graph 1210 as though the first optical transceiver device were installed in a single location.

Similarly, the second graph 1220 includes the parametric data measurements generated by the second optical transceiver device and depicted by the fourth graph 1120 of FIG. 11. However, the aggregated parametric data measurements depicted by the second graph 1220 does not include the absence of parametric data measurements depicted by fourth graph 1120 when the second optical transceiver device was uninstalled from the communication system. Therefore, the second graph 1220 only depicts thirteen days' worth of parametric data measurements instead of sixteen days. Further, the aggregated parametric data measurements are concatenated in graph 1220 as though the second optical transceiver device were installed in a single location. By aggregating the parametric data of the optical transceiver devices in this way, the optical transceiver devices can be effectively evaluated according to the time during which the optical transceivers are actually installed and in use.

Referring again to FIG. 10, method 1000 continues to 1020 after generating the time series dataset. At 1020, method 1000 calculates a plurality of features from the time series dataset. The plurality of features comprise the features that a learning model is trained with in order to predict a defect of an optical transceiver device. As discussed hereinabove, a defect of an optical transceiver device may be detected or predicted based at least on transmit bias of the optical transceiver device. Thus, the plurality of features may comprise a plurality of features or attributes that characterize the transmit bias as represented in the time series dataset for the transmit bias of the optical transceiver device.

For example, the plurality of features may include one or more statistical attributes of the time series dataset. For example, the plurality of features may include a skew or skewness of the transmit bias dataset, wherein the skew quantitatively characterizes the symmetry of the probability density function of the amplitude of the dataset. As another example, the plurality of features may include a kurtosis of the transmit bias dataset, wherein the kurtosis quantitatively characterizes the sharpness of the peak of the probability density function.

The plurality of features may further include one or more attributes of a linear model of the transmit bias as well as one or more attributes of the residuals of the linear model. Thus, method 1000 may apply a linear model to the transmit bias dataset, and calculate a linear model time slope, a linear model transmit bias intercept, and a linear model R-squared value, as some examples. Further, method 1000 may calculate residuals of the linear model and may further calculate a plurality of features based on the residuals, including a linear model residual absolute sum, a residual skew, a residual kurtosis, a residual binary zero crossing, a time-only residual binary zero crossing, a first zero crossing sign, a last zero crossing sign, and a number of swaps.

The plurality of features may further include features relating to analysis of the time series. For example, method 1000 may apply dynamic time warping to the time series dataset to calculate a dynamic time warping distance for the time series dataset. The plurality of features may thus include the dynamic time warping distance, as well as the number of data points.

Furthermore, the temperature of the optical transceiver device is positively covariant with the transmit bias, and thus temperature of the optical transceiver device may further be used a feature for predicting a defect of the optical transceiver device. To that end, the plurality of features may include an average temperature, and a linear model temperature slope.

Overall, method 1000 may calculate each of the plurality of features at 1020 based on the time series datasets for the transmit bias and the temperature. The plurality of features may include one or more of a transmit bias skew, a transmit bias kurtosis, an average transmit bias, an average temperature, a linear model time slope, a linear model temperature slope, a linear model transmit bias intercept, a linear model R-squared value, a linear model residual absolute sum, a residual skew, a residual kurtosis, a residual binary zero crossing, a time-only residual binary zero crossing, a first zero crossing sign, a last zero crossing sign, a dynamic time warping distance, a number of swaps, and a number of data points.

At 1025, method 1000 inputs the plurality of features calculated at 1020 to a learning model configured to predict a defect of an optical transceiver device. The learning model may comprise, as illustrative and non-limiting examples, a logistic regression model, a random forest model, a gradient-boosted trees model, or another statistical model. Preliminary testing results with such learning models indicate that a logistic regression model, a random forest model, and a gradient-boosted trees model perform with 98.4% accuracy, 99.3% accuracy, and 98.8% accuracy, respectively, with a respective true-positive rate of 62.5%, 62.5% and 75%. These testing results were obtained with the learning models trained on 1,980 observations of 1,980 optical transceiver devices wherein 36 of the optical transceiver devices include dark line defects, and an additional testing dataset including 1,194 observations with 8 dark line defects.

The learning model may be trained on a plurality of data observations for different optical transceiver devices with or without a defect such as a dark line defect. The training of the learning model may be supervised in that each data entry for a given optical transceiver device includes an indication of whether or not the given optical transceiver device includes a dark line defect. For example, a training dataset for the learning model may include a plurality of observations, each observation corresponding to a different optical transceiver device, wherein a number of the optical transceiver devices include a dark line defect. Each observation includes the plurality of features calculated for the corresponding optical transceiver device, as well as an indication of whether the corresponding optical transceiver device includes a dark line defect. The indication of whether the optical transceiver device includes a dark line defect may be manually labeled. After training the learning model with the training dataset, the learning model is configured to determine, based on the plurality of features calculated at 1020 and input to the learning model at 1025, whether the optical transceiver device includes a defect such as a dark line defect.

Thus, at 1030, method 1000 receives a prediction of a defect from the learning model. The prediction received from the learning model may comprise, for example, a binary output (e.g., 0 and 1) corresponding to either "Yes" or "No," or similarly, "True" or "False," wherein the "Yes" or "True" outputs indicate that the defect is present in the optical transceiver device whereas the "No" or "False" outputs indicate that the defect is not present in the optical transceiver device. As another example, the prediction received from the learning model may comprise a probability that the optical transceiver device includes the defect, and thus the prediction may range, for example, from 0 to 1. In such an example, the optical transceiver device may be considered to include the defect is the probability is above a threshold probability. For example, the threshold may be selected such that probabilities above the threshold are likely to include the defect, while probabilities below the threshold are likely to not include the defect. The threshold may be selected or optimized to minimize the number of false positives produced by the learning model.

Continuing at 1035, method 1000 determines if a defect is predicted. Method 1000 determines if a defect is predicted by the learning model based on the output of the learning model. For example, if the output of the learning model is binary (e.g., 0 or 1), the method 1000 determines that the optical transceiver device is predicted to include a defect if the output is 1, whereas the method 1000 determines that the optical transceiver device is predicted to not include a defect if the output is 0. If the output of the learning model comprises a probability, as discussed hereinabove, method 1000 determines if a defect is predicted based on whether the probability received at 1030 is above the probability threshold.

If a defect is not predicted ("NO"), method 1000 proceeds to 1040. At 1040, method 1000 outputs the time series dataset to memory. The time series dataset may thus be retrieved later for aggregation with additional parametric data for the optical transceiver device for additional diagnostic monitoring of the optical transceiver device. Additionally, in some examples, the time series dataset may be used to further train the learning model. In other examples, method 1000 may discard the time series dataset. Additionally, in some examples, method 1000 may output an indication that the optical transceiver device is not predicted to include a defect, along with a timestamp indicating when the prediction was calculated. Method 1000 then returns.

However, referring again to 1035, if a defect is predicted ("YES"), method 1000 proceeds to 1045. At 1045, method 1000 flags the device as defective. For example, method 1000 may generate and output an error indicating that the optical transceiver device is defective to one or more of the inventory log 121 and the system log 123. Continuing at 1050, method 1000 generates and outputs an alert or a notification indicating that the optical transceiver device includes a defect. For example, the alert may be output via a user interface, such as user interface 113, or to a display device for alerting a user that the optical transceiver device is defective. In this way, the user may replace the defective transceiver device. As method 1000 is capable of predicting that an optical transceiver device includes a defect before the defect fully inhibits the functionality of the optical transceiver device, the optical transceiver device may be replaced or otherwise serviced prior to the optical transceiver device causing a hard system failure. Method 1000 then returns.

By utilizing the eighteen features discussed above as inputs to the learning model, the exponential signature in the transmit bias time series that indicates a dark line defect may be detected before the exponential signature is easily observable to a human evaluating the time series. In this way, the present method for predicting degradation of an optical transceiver device is highly advantageous when compared to threshold-based methods or manually evaluating transmit bias signatures for exponentiality. By predicting the degradation before the degradation substantially affects performance of the optical transceiver device, a user may be notified of the degraded optical transceiver device. In this way, the optical transceiver device may be serviced or replaced before the optical transceiver device may cause a system failure. In the context of imaging systems, early servicing or replacement of optical transceiver devices with dark line defects prevents degradation of sensitive imaging data that may be transmitted and/or received by the optical transceiver devices, as well as failure of the imaging system which would result in significant downtime for the imaging system.

A technical effect of the disclosure includes the prediction of a defect in an optical transceiver device based on parametric data of the optical transceiver device. Another technical effect of the disclosure includes the generation of an alert that an optical transceiver device is predicted to include a defect. Yet another technical effect of the disclosure includes the detection of degradation in an optical transceiver device without the use of intrusive techniques such as removing the optical transceiver device from a communication system and connecting the optical transceiver device directly to a computer for manual evaluation.

In one embodiment, a method comprises predicting degradation of an optical transceiver device based on values of an operating parameter of the optical transceiver device obtained over time, and generating a notification of the degradation of the optical transceiver device.

In a first example of the method, the operating parameter comprises a transmit bias of the optical transceiver device. In a second example of the method optionally including the first example, the operating parameter further comprises temperature of the optical transceiver device. In a third example of the method optionally including one or more of the first and second examples, predicting the degradation of the optical transceiver device comprises detecting a characteristic signature in the operating parameter indicating a dark line defect of the optical transceiver device. In a fourth example of the method optionally including one or more of the first through third examples, detecting the characteristic signature comprises detecting an exponential increase in the operating parameter. In a fifth example of the method optionally including one or more of the first through fourth examples, the method further comprises aggregating parametric data extracted from the optical transceiver device and optical transceiver device configuration data to generate a time series dataset. In a sixth example of the method optionally including one or more of the first through fifth examples, the method further comprises calculating a plurality of features from the time series dataset. In a seventh example of the method optionally including one or more of the first through sixth examples, the plurality of features includes one or more of a transmit bias skew, a transmit bias kurtosis, an average transmit bias, an average temperature, a linear model time slope, a linear model temperature slope, a linear model transmit bias intercept, a linear model R-squared value, a linear model residual absolute sum, a residual skew, a residual kurtosis, a residual binary zero crossing, a time-only residual binary zero crossing, a first zero crossing sign, a last zero crossing sign, a dynamic time warping distance, a number of swaps, and a number of data points. In an eighth example of the method optionally including one or more of the first through seventh examples, predicting the degradation of the optical transceiver device based on the operating parameter comprises inputting the plurality of features into a machine learning model to generate a prediction of the degradation. In a ninth example of the method optionally including one or more of the first through eighth examples, the machine learning model comprises one or more of a gradient boosted trees model, a random forest model, and a logistic regression model.

In another embodiment, a method comprises retrieving parametric data for an optical transceiver device, generating a time series dataset with the parametric data, extracting a plurality of features from the time series dataset, and predicting, with a learning model, a degradation of the optical transceiver device based on the plurality of features.

In a first example of the method, the method further comprises retrieving system configuration data for the optical transceiver device, wherein the time series dataset is further generated with the system configuration data. In a second example of the method optionally including the first example, the method further comprises, responsive to predicting the degradation of the optical transceiver device, determining an installation location of the optical transceiver device based on the system configuration data, and generating a notification of the degradation, the notification including an installation location of the optical transceiver device. In a third example of the method optionally including one or more of the first and second examples, predicting the degradation of the optical transceiver device based on the plurality of features comprises inputting the plurality of features into the learning model to detect an exponential increase in transmit bias over time.

In yet another embodiment, a system comprises a communication system including a plurality of optical transceiver devices, and a processor configured with instructions in non-transitory memory that when executed cause the processor to predict degradation of an optical transceiver device of the plurality of optical transceiver devices based on a measured operating parameter of the optical transceiver device.

In a first example of the system, the processor is further configured with instructions in non-transitory memory that when executed cause the processor to generate a notification of the degradation, the notification indicating an installation location of the optical transceiver device within the communication system. In a second example of the system optionally including the first example, the measured operating parameter includes one or more of transmit bias of the optical transceiver device and a temperature of the optical transceiver device. In a third example of the system optionally including one or more of the first and second examples, the processor is further configured with instructions in non-transitory memory that when executed cause the processor to generate a time series dataset from parametric data of the optical transceiver device, extract a plurality of features from the time series dataset, and input the plurality of features to a learning model to predict the degradation. In a fourth example of the system optionally including one or more of the first through third examples, the plurality of features includes one or more of a transmit bias skew, a transmit bias kurtosis, an average transmit bias, an average temperature, a linear model time slope, a linear model temperature slope, a linear model transmit bias intercept, a linear model R-squared value, a linear model residual absolute sum, a residual skew, a residual kurtosis, a residual binary zero crossing, a time-only residual binary zero crossing, a first zero crossing sign, a last zero crossing sign, a dynamic time warping distance, a number of swaps, and a number of data points. In a fifth example of the system optionally including one or more of the first through fourth examples, the learning model comprises one or more of a gradient boosted trees model, a random forest model, and a logistic regression model.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
predicting degradation of an optical transceiver device based on values of an operating parameter of the optical transceiver device obtained over time; and
generating a notification of the degradation of the optical transceiver device,
wherein predicting the degradation of the optical transceiver device comprises detecting a characteristic signature in the operating parameter indicating a dark line defect of the optical transceiver device.

2. The method of claim 1, wherein the operating parameter comprises a transmit bias of the optical transceiver device.

3. The method of claim 2, wherein the operating parameter further comprises temperature of the optical transceiver device.

4. The method of claim 1, wherein detecting the characteristic signature comprises detecting an exponential increase in the operating parameter.

5. The method of claim 1, further comprising aggregating parametric data extracted from the optical transceiver device and optical transceiver device configuration data to generate a time series dataset.

6. The method of claim 5, further comprising calculating a plurality of features from the time series dataset.

7. The method of claim 6, wherein the plurality of features includes one or more of a transmit bias skew, a transmit bias kurtosis, an average transmit bias, an average temperature, a linear model time slope, a linear model temperature slope, a linear model transmit bias intercept, a linear model R-squared value, a linear model residual absolute sum, a residual skew, a residual kurtosis, a residual binary zero crossing, a time-only residual binary zero crossing, a first zero crossing sign, a last zero crossing sign, a dynamic time warping distance, a number of swaps, and a number of data points.

8. The method of claim 6, wherein predicting the degradation of the optical transceiver device based on the operating parameter comprises inputting the plurality of features into a machine learning model to generate a prediction of the degradation.

9. The method of claim 8, wherein the machine learning model comprises one or more of a gradient boosted trees model, a random forest model, and a logistic regression model.

10. A method, comprising:
retrieving parametric data for an optical transceiver device;
generating a time series dataset with the parametric data;
extracting a plurality of features from the time series dataset; and
predicting, with a learning model, a degradation of the optical transceiver device based on the plurality of features,
wherein predicting the degradation of the optical transceiver device based on the plurality of features comprises inputting the plurality of features into the learning model to detect an exponential increase in transmit bias over time.

11. The method of claim 10, further comprising retrieving system configuration data for the optical transceiver device, wherein the time series dataset is further generated with the system configuration data.

12. The method of claim 11, further comprising, responsive to predicting the degradation of the optical transceiver device, determining an installation location of the optical transceiver device based on the system configuration data, and generating a notification of the degradation, the notification including the installation location of the optical transceiver device.

13. A system, comprising:
a communication system comprising a plurality of optical transceiver devices;
a processor configured with instructions in non-transitory memory that when executed cause the processor to:
predict degradation of an optical transceiver device of the plurality of optical transceiver devices based on a measured operating parameter of the optical transceiver device,
wherein predicting the degradation of the optical transceiver device comprises detecting a characteristic signature in the measured operating parameter indicating a dark line defect of the optical transceiver device.

14. The system of claim 13, wherein the processor is further configured with instructions in non-transitory memory that when executed cause the processor to generate a notification of the degradation, the notification indicating an installation location of the optical transceiver device within the communication system.

15. The system of claim 13, wherein the measured operating parameter includes one or more of transmit bias of the optical transceiver device and a temperature of the optical transceiver device.

16. The system of claim 13, wherein the processor is further configured with instructions in non-transitory memory that when executed cause the processor to generate a time series dataset from parametric data of the optical transceiver device, extract a plurality of features from the time series dataset, and input the plurality of features to a learning model to predict the degradation.

17. The system of claim 16, wherein the plurality of features includes one or more of a transmit bias skew, a transmit bias kurtosis, an average transmit bias, an average temperature, a linear model time slope, a linear model temperature slope, a linear model transmit bias intercept, a linear model R-squared value, a linear model residual absolute sum, a residual skew, a residual kurtosis, a residual binary zero crossing, a time-only residual binary zero crossing, a first zero crossing sign, a last zero crossing sign, a dynamic time warping distance, a number of swaps, and a number of data points.

18. The system of claim 16, wherein the learning model comprises one or more of a gradient boosted trees model, a random forest model, and a logistic regression model.

* * * * *